United States Patent
Friede et al.

(10) Patent No.: US 6,637,809 B1
(45) Date of Patent: Oct. 28, 2003

(54) VEHICLE WITH NOVEL FRAME RAILS

(75) Inventors: Matthew D. Friede, Fort Wayne, IN (US); Daniel T. Logan, Fremont, IN (US); Dennis J. Ulman, Fort Wayne, IN (US)

(73) Assignee: International Truck Intellectual Property Company, LLC., Warrenville, IL (US)

( * ) Notice: Subject to any disclaimer, the term of this patent is extended or adjusted under 35 U.S.C. 154(b) by 0 days.

(21) Appl. No.: 10/317,328

(22) Filed: Dec. 12, 2002

(51) Int. Cl.[7] .................................................. B60J 7/00
(52) U.S. Cl. ................. 296/204; 280/781; 280/124.116
(58) Field of Search .......................... 296/204, 203.01, 296/208, 146.6, 189, 181, 190.07; 280/685, 790, 781, 124.116, 124.174, 800, 124.128, 124.104, 784, 788, 124.109, 423; 105/215.2, 413; 52/694

(56) References Cited

U.S. PATENT DOCUMENTS

| | | | | |
|---|---|---|---|---|
| 3,559,826 A | * | 2/1971 | Abromavage et al. ...... 296/204 |
| 3,638,962 A | * | 2/1972 | Gardner ...................... 280/685 |
| 3,704,671 A | * | 12/1972 | Horne et al. ............. 105/215.2 |
| 4,526,418 A | * | 7/1985 | Martin ........................ 296/204 |
| 4,671,562 A | * | 6/1987 | Broadbent .................. 296/181 |
| 4,697,844 A | * | 10/1987 | Giles .......................... 280/790 |
| 4,726,166 A | * | 2/1988 | DeRees ......................... 52/694 |
| 4,838,605 A | * | 6/1989 | Abromavage ............... 296/204 |
| 5,085,025 A | * | 2/1992 | Gaddis ........................ 296/204 |
| 5,190,433 A | * | 3/1993 | Boda .......................... 280/781 |
| 5,205,587 A | * | 4/1993 | Orr ............................. 296/204 |
| 5,634,663 A | * | 6/1997 | Krupp et al. ............... 280/781 |
| 5,775,231 A | * | 7/1998 | Kammerhofer et al. ..... 105/413 |
| 5,855,394 A | * | 1/1999 | Horton et al. .............. 296/204 |
| 5,967,597 A | * | 10/1999 | Vander Kooi et al. .. 296/190.07 |
| 6,086,077 A | * | 7/2000 | Stuart .................. 280/124.116 |
| 6,189,930 B1 | * | 2/2001 | Kalazny ..................... 296/204 |
| 6,206,407 B1 | * | 3/2001 | Fuchs et al. .......... 280/124.174 |
| 6,250,679 B1 | * | 6/2001 | Schnell ....................... 280/800 |
| 6,357,769 B1 | * | 3/2002 | Omundson et al. ......... 280/781 |
| 6,375,203 B1 | * | 4/2002 | Warinner et al. ..... 280/124.128 |
| 6,394,474 B1 | * | 5/2002 | Warinner et al. ..... 280/124.104 |
| 6,398,260 B1 | * | 6/2002 | Rinehart ..................... 296/204 |
| 6,398,261 B1 | * | 6/2002 | Ammer et al. .............. 296/204 |
| 6,471,223 B1 | * | 10/2002 | Richardson .......... 280/124.116 |
| 6,550,561 B2 | * | 4/2003 | Dau et al. ................... 280/784 |
| 6,572,146 B2 | * | 6/2003 | Baginski ..................... 296/204 |
| 2002/0185327 A1 | * | 12/2002 | Morykon et al. ........... 280/788 |
| 2003/0001354 A1 | * | 1/2003 | Pavuk ................. 280/124.109 |
| 2003/0038471 A1 | * | 2/2003 | Svartz et al. ............... 280/781 |
| 2003/0047906 A1 | * | 3/2003 | Hicks et al. ................ 280/423 |
| 2003/0089541 A1 | * | 5/2003 | Sutton ................... 296/190.07 |

* cited by examiner

*Primary Examiner*—Kiran Patel
(74) *Attorney, Agent, or Firm*—Jeffrey P. Calfa; Neil T. Powell; Dennis Kelly Sullivan

(57) ABSTRACT

A vehicle has a novel frame structure that comprises two novel frame rails that extend parallel to the longitudinal axis of the vehicle and cross-members that are fixedly engaged between the two novel frame rails. Each of the novel frame rails comprises a web that extends vertically along the length of the frame rail, an upper flange that extends horizontally from an upper end of the web, and a lower flange that extends horizontally from a lower end of the web. Each of the novel frame rails further comprises one or more reinforcing lips, each of which extends vertically from an outer end of either the upper flange or the lower flange.

19 Claims, 4 Drawing Sheets

VEHICLE WITH NOVEL FRAME RAILS

BACKGROUND OF THE INVENTION

The present invention relates to vehicles that comprise one or more frame structures which have two frame rails that extend parallel to one another and cross-members that are fixedly engaged between the frame rails.

DRAWINGS

Other objects and advantages of the invention will become more apparent upon perusal of the detailed description thereof and upon inspection of the drawings in which.

DETAILS OF INVENTION

Figure 1:
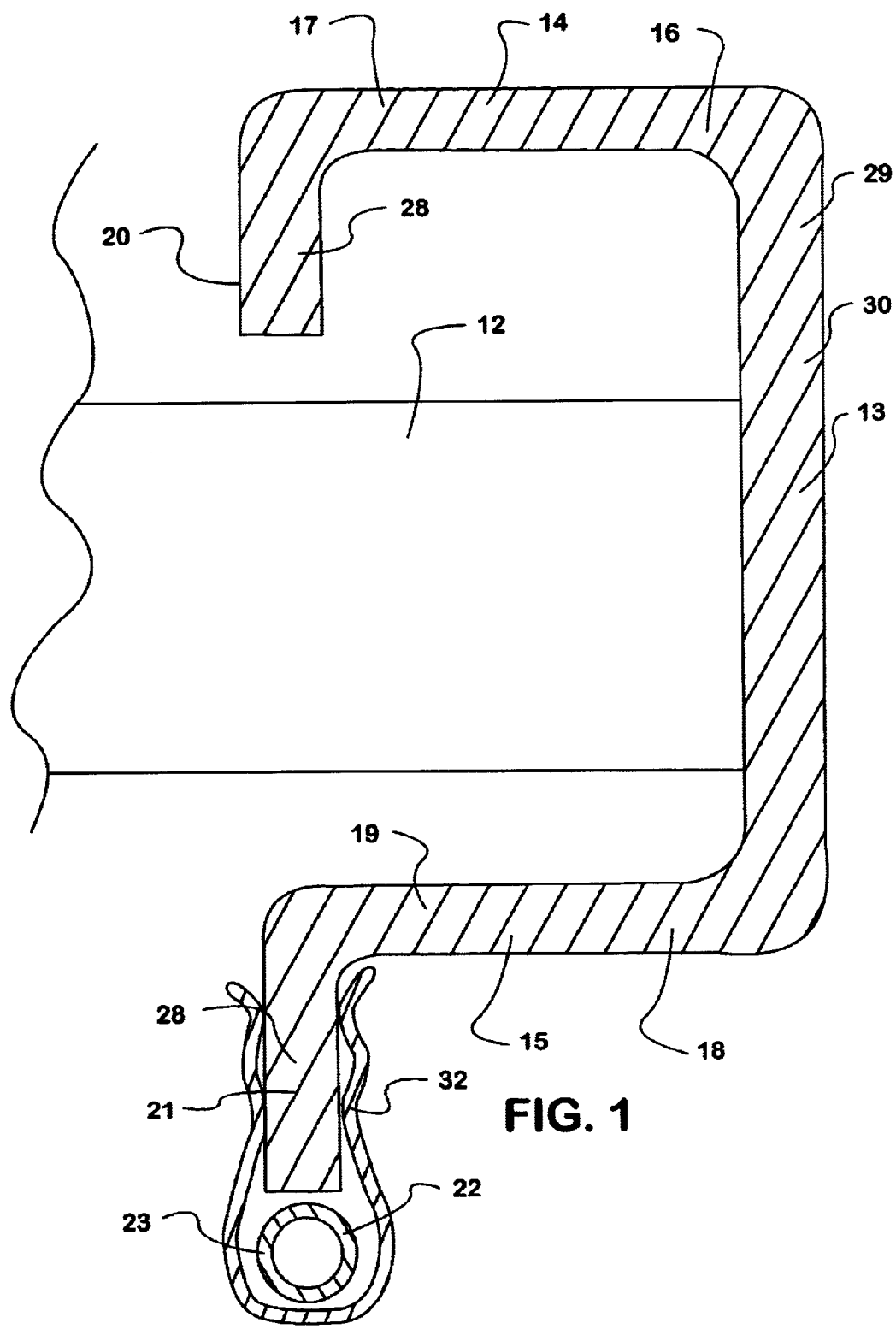
FIG. 1 is a sectional view of a novel frame rail according to the present invention with an upper reinforcing-lip, a lower reinforcing-lip, and a conducting member mounted to the lower reinforcing-lip.
Figure 2:
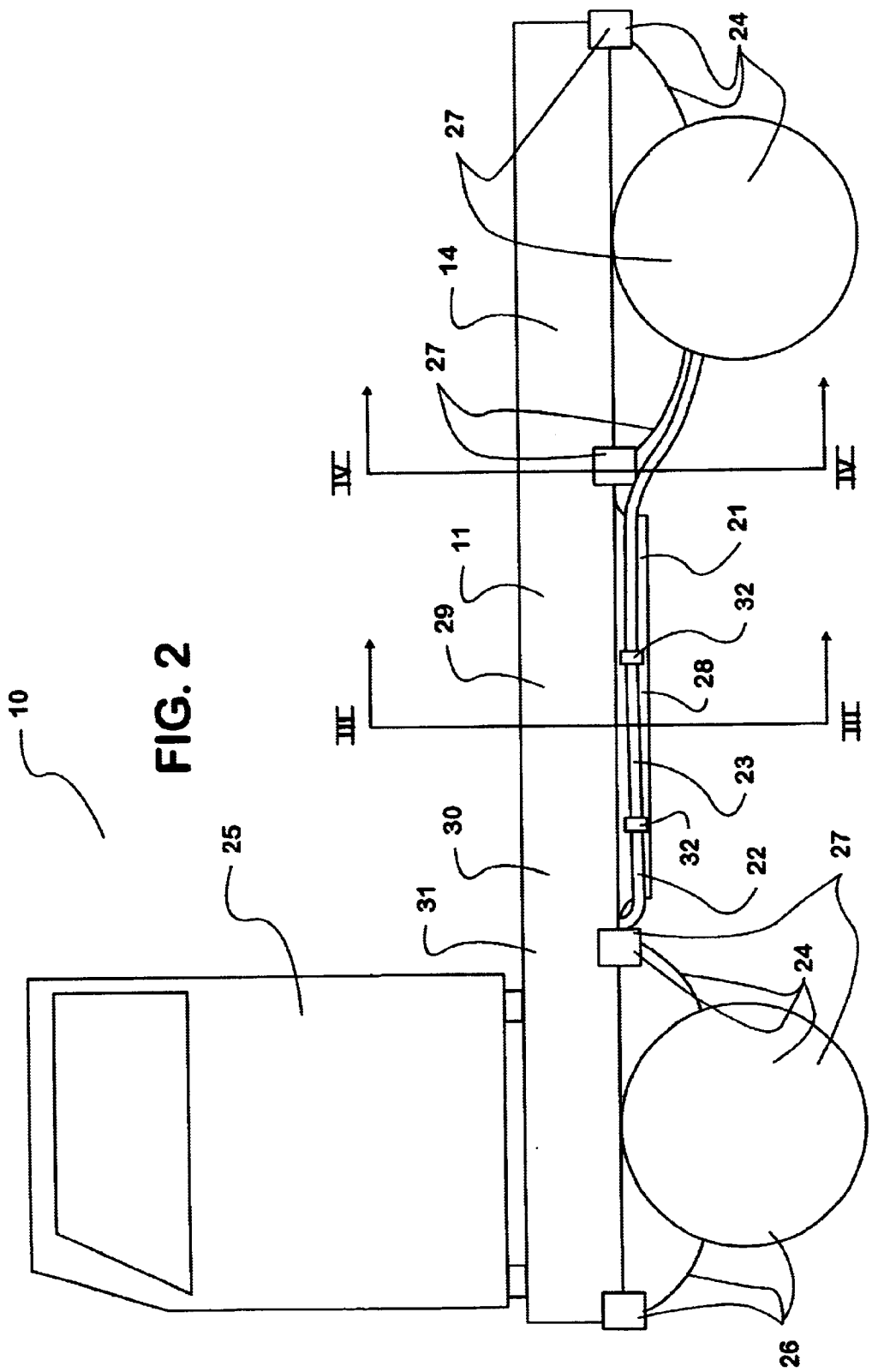
FIG. 2 is a side elevation of a vehicle according to the present invention that has novel frame rails that have a lower reinforcing-lip that is disposed entirely between a rearward most point of the front suspension-unit and a forward most point of the rear suspension-unit.
Figure 3:
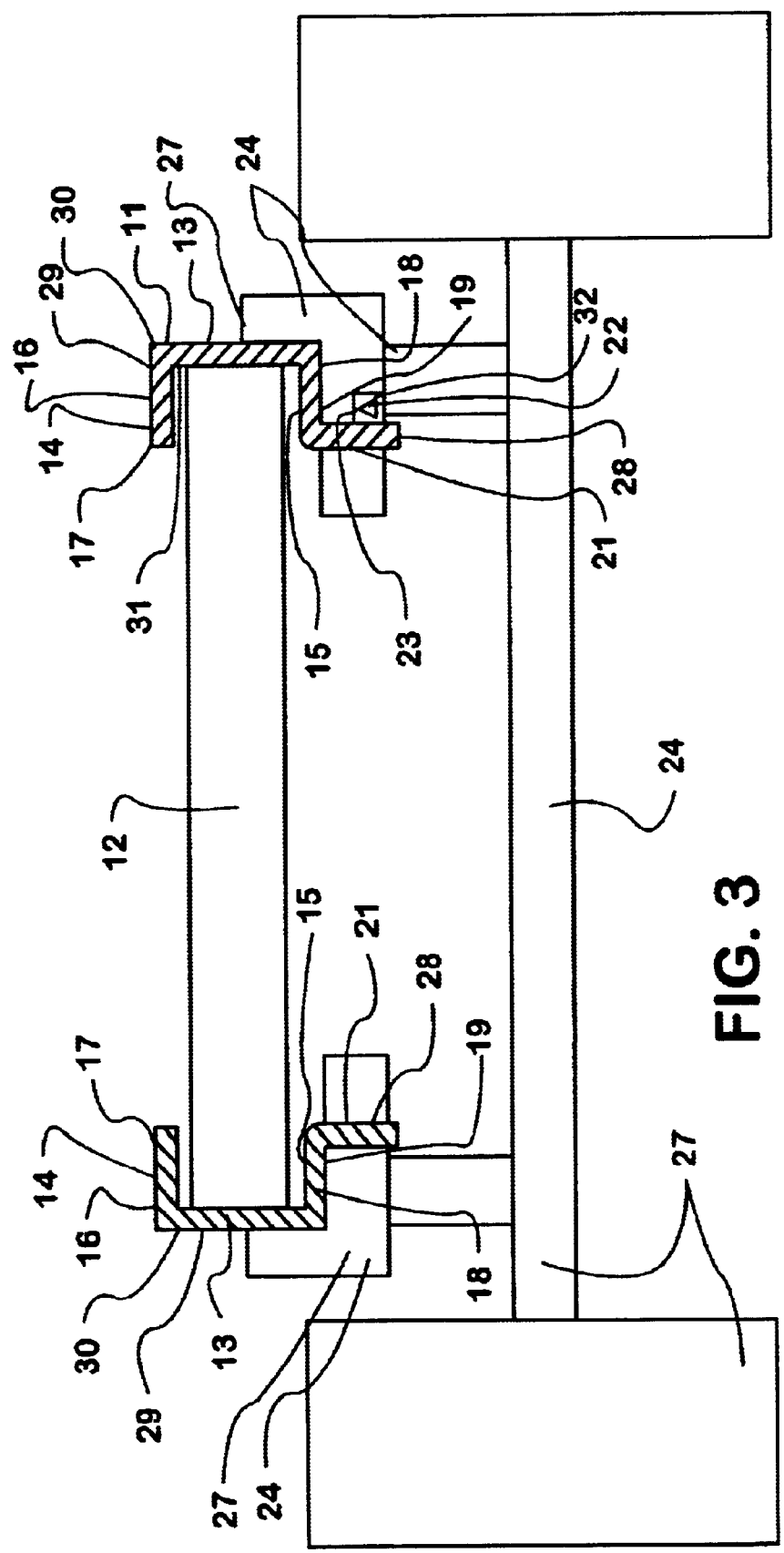
FIG. 3 is a sectional view through line III—III of FIG. 2.
Figure 4:
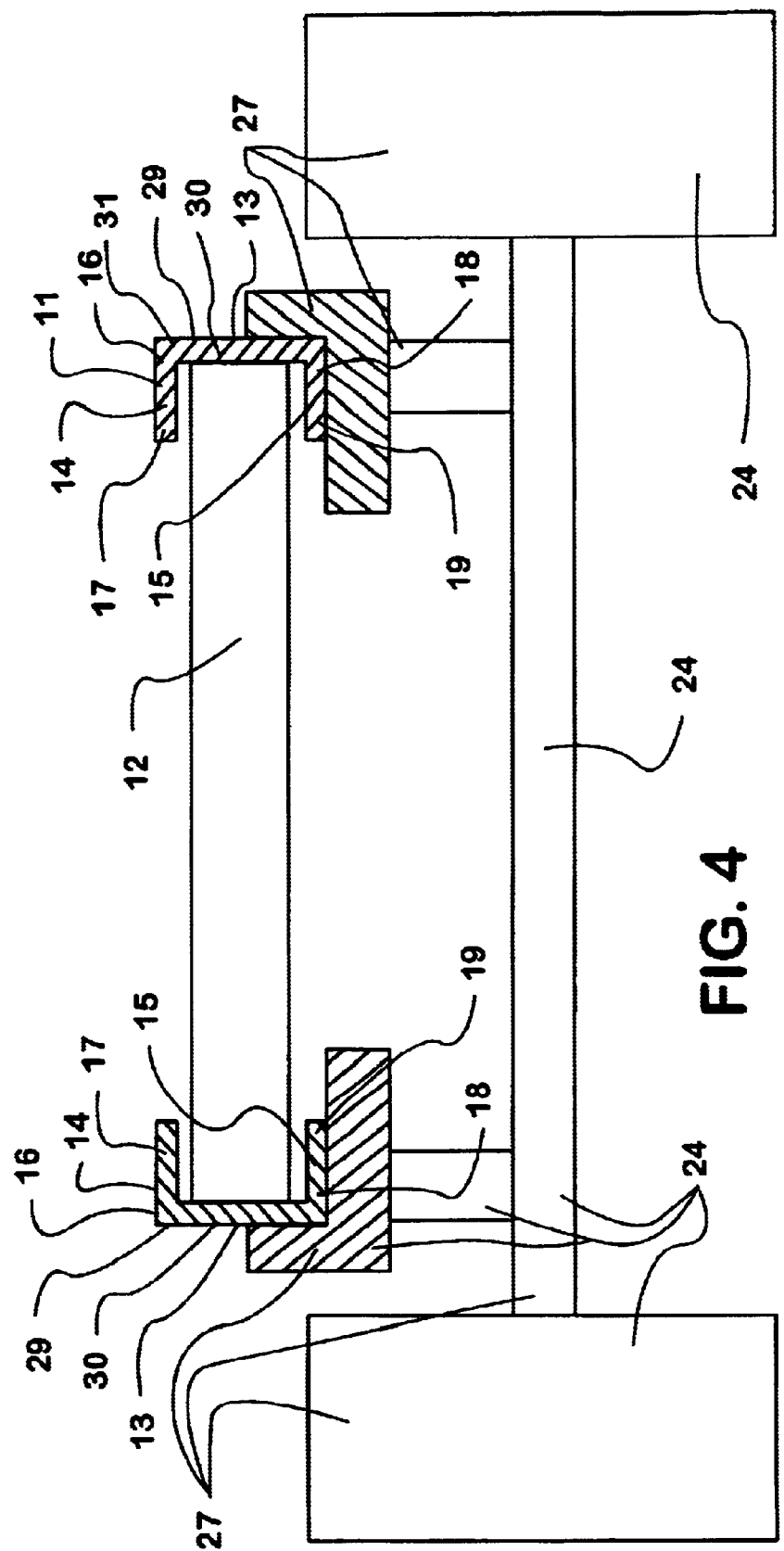
FIG. 4 is a sectional view through line IV—IV of FIG. 3.

As is illustrated in FIGS. 1–4, the present invention is a vehicle 10 with one or more frame structures 11 each of which comprises two frame rails 29. The two frame rails 29 of a frame-structure 11 of a vehicle 10 according to the present invention extend parallel to one another and the longitudinal axis of the vehicle 10. Cross-members 12 are fixedly engaged to and extend between the two frame rails 29 of a frame structured 11 of a vehicle 10 according to the present invention. A vehicle 10 according to the present invention may comprise only one frame structure 11 or it may comprise multiple frame structures 11. Passenger cars with uni-body construction are exemplary of one type of vehicle in which it is known to utilize multiple frame structures including one frame structure attached to the forward end of the main body structure thereof and one frame structure attached to the rearward end of the main body structure thereof. The frame structures 11 of a vehicle 10 are relatively strong and rigid assemblies that to which a majority of other components of the vehicle 10 are directly or indirectly engaged. The frame structures 11 of a vehicle 10 according to the present invention function, in aggregate, to maintain proper relative location of the other components of the vehicle 10. A vehicle 10 according to the present invention further comprises one or more body structures 25 that are mounted to its frame structures 11. The body structures 25 of a vehicle 10 according to the present invention are tailored to provide a place for cargo and/or occupants of the vehicle 10 to reside.

The components of a vehicle 10 that its frame structures 11 function to maintain proper relative location of also comprise a suspension system 24. The suspension system 24 of a vehicle is engaged to the frame structures 11 of the vehicle 10 in such a manner to support those frame structures 11 above the ground. The suspension system 24 of a vehicle 10 is further constructed in such a manner to provide the vehicle 10 with a relatively low resistance to movement along the ground. In many cases the suspension system 24 is further constructed to provide the frame structures 11 and components mounted thereto with a relatively gentle ride by effecting vertical accelerations of the frame structures 11 that are relatively gentle and gradual as compared to the vertical accelerations experienced by the suspension system 24 at its point of contact with the ground.

A vehicle 10 according to the present invention comprises one or more frame structures 11 that are novel frame structures 31 by virtue of having two frame rails 29 that are novel frame rails 30. As is best illustrated in FIG. 1, a novel frame rail 30 according to the present invention comprises a web 13 that extends vertically along the length of the novel frame rail 30. A novel frame rail 30 according to the present invention further comprises an upper flange 14 that has an inner end 16 that is engaged to an upper end of the web 13 and that extends horizontally from the web 13 along at least a portion of the length of the novel frame rail 30. A novel frame rail 30 according to the present invention also comprises a lower flange 15 that has an inner end 18 that is engaged to a lower end of the web 13 and that extends horizontally from the web 13 along at least a portion of the length of the novel frame rail 30. A novel frame rail 30 according to the present invention further comprises one or more reinforcing-lips 28. A novel frame rail 30 according to the present invention may comprise an upper reinforcing-lip 20 that extends vertically from an outer end 17 of the upper flange 14 along at least a portion of the length of the novel frame rail 30. In addition to or instead of an upper reinforcing-lip 20 a novel frame rail 30 according to the present invention may comprise a lower reinforcing-lip 21 that extends vertically from an outer end 19 of the lower flange 15 along at least a portion of the length of the novel frame rail 30.

A novel frame structure 31 according to the present invention may extend along only a part of the vehicle 10 or along substantially the entire length of the vehicle 10. In embodiments of the present invention in which a novel frame structure 31 of the vehicle 10 extends along substantially the entire length of the vehicle 10, the novel frame rails 30 also extend along substantially the entire length of the vehicle 10. Of course, in embodiments where the novel frame rails 30 extend along substantially the entire length of the vehicle 10 there may be some components, such as bumpers, lights and tow hooks, that are disposed forward and/or rearward of the novel frame rails 30.

A suspension system 24 of a vehicle 10 according to the present invention may be constructed and engaged to the frame structures 11 thereof in any of a number of manners tailored to the application of the vehicle 10. In some embodiments of the present invention in which the novel frame structure 31 and its novel frame rails 30 extend along substantially the entire length of the vehicle 10, the suspension system 24 may comprise a front suspension-unit 26 and a rear suspension-unit 27. In such embodiments of the present invention the front suspension-unit 26 is engaged to and supports a forward portion of the novel frame-rails 30 of the novel frame structure 31 and the rear suspension-unit 27 is engaged to and supports a rearward portion of the novel frame rails 30 of the novel frame structure 31.

A novel frame rail 30 according to the present invention may have reinforcing lips 28 extending from its upper flange 14 and lower flange 15 in any of a number of different combinations of distribution and orientation (vertically up or vertically down) tailored to the particular application of the novel frame rail 30. In some embodiments of the present invention the novel frame rails 30 of a novel frame structure 31 each have a lower reinforcing-lip 21 that extends vertically downwardly from the outer end 19 of the lower flange 15. In other embodiments of the present invention the novel frame rails 30 of a novel frame structure 31 each have a lower reinforcing-lip 21 that extends vertically upwardly from the outer end 19 of the lower flange 15. In some embodiments of the present invention the novel frame rails 30 of a novel frame structure 31 each have an upper reinforcing-lip 20 that extends vertically downwardly from the outer end 17 of the upper flange 14. In other embodiments of the present invention the novel frame rails 30 of a novel frame structure 31 each have an upper reinforcing-lip 20 that extends vertically upwardly from the outer end 17 of the upper flange 14. In some embodiments of the present invention each of the novel frame rails 30 comprises an upper reinforcing-lip 20, but no lower reinforcing-lip 21. In other embodiments of the present invention each of the novel frame rails 30 comprises a lower reinforcing-lip 21, but no upper reinforcing-lip 21. In still other embodiments of the present invention each of the novel frame rails 30 comprises both an upper reinforcing-lip 20 and a lower reinforcing-lip 21. In some embodiments of the present invention each of the novel frame rails 30 comprises a lower reinforcing-lip 28 that extends vertically downwardly and is disposed entirely between a rearmost point of the front suspension-unit 26 and a forward-most point of the rear suspension-unit. A novel frame rail 30 with a lower reinforcing-lip 21 that extends along only a portion between the front suspension-unit 26 and the rear suspension-unit 27 is advantageously reinforced by the lower reinforcing-lip 21 while still having portions of the lower flange 15 in front of and behind the lower reinforcing-lip 21 that define downwardly-facing, uncluttered horizontal surfaces for engagement of the front suspension-unit 26 and the rear suspension-unit 27 to the novel frame rail 30.

In addition to reinforcing the novel frame rails 30, the reinforcing lips 28 are a convenient place to mount conducting members 22 of the vehicle 10. Many embodiments of vehicles 10 according to the present invention include numerous different conducting members 22 including electricity-conducting wiring and/or fluid-conducting tubing of both flexible and inflexible types. Many of the conducting members 22 of vehicles 10 according to the present invention extend from one longitudinal portion of the vehicle 10 to another longitudinal portion of the vehicle 10 and need to be supported at portions therebetween. In some embodiments of the present invention portions of one or more conducting member 22 of the vehicle 10 are mounted through fasteners 32 and extend parallel to one or more of the reinforcing lips 28 of the novel frame rails 30. The fasteners 32 that are used to mount conducting member 22 to a reinforcing lip 28 of a novel frame rail 30 may be any of a myriad of well-known and/or future conceived types of fasteners constructed for mounting conducting members 22 to support members such as frame rails 29. Conducting members may be conveniently mounted to an upper reinforcing-lip 20 and/or to a lower reinforcing-lip 21. Mounting a conducting member 22 to a downwardly extending lower reinforcement-lip 21 is particularly convenient because the space adjacent a downwardly extending lower reinforcement-lip 21 is generally free of obstructions such as cross-members of the novel frame structure 31, body structures 25 and many other common obstructions to routing conducting members 22 longitudinally of the vehicle.

As was alluded to above, there are innumerable different types of conducting members 22 that a vehicle 10 according to the present invention may include and which may be mounted to reinforcing lips 28 of novel frame rails 30 of such a vehicle 10. In some embodiments of the present invention a vehicle 10 comprises an air-actuated brake-system that include conducting members 22 that are pressurized-air-transmission conduits 23 for conducting pressurized air between the components of the air-actuated brake-system. In fact, the air-actuated brake-systems of vehicles 10 generally comprise substantial lengths of relatively large pressurized-air-transmission conduits 23 some of which extends longitudinally of the vehicle 10 from a forward portion thereof to the rear suspension-unit 27 of the vehicle 10. In such embodiments of the present invention mounting one or more of the pressurized-air-transmission conduits 23 of the air-actuated brake-system to the reinforcing lips 28 of the novel frame rails is a convenient manner of supporting those pressurized-air-transmission conduits 23.

It will, of course, be understood that an entrance-door safety-system 11 and a assembly 12 that comprises it could be of any of a number of different constructions within the guidelines set forth above and that some features of the invention could be employed without a corresponding use of other features.

We claim:

1. A vehicle, comprising:
   (a) a novel frame structure that includes two novel frame rails that extend parallel to one another and a plurality of cross-members that extend transversely between and are fixedly engaged to both of said novel frame rails;
   (b) a suspension system that is engaged to said novel frame structure in a manner to support said novel frame structure above the ground;
   (c) wherein said suspension system is constructed in such a manner to provide said vehicle with relatively little resistance to movement along the ground;
   (d) one or more body structures that are mounted to and supported by said novel frame structure and upon or within which cargo and/or occupants may reside;
   (e) wherein each of said novel frame rails comprises a vertically-extending web to an upper end of which an inner end of a horizontally-extending upper flange is fixedly engaged;
   (f) wherein an inner end of a horizontally-extending lower flange is fixedly engaged to a lower end of said web of each of said novel frame rails;
   (g) wherein each of said novel frame rails further comprises one or more reinforcing lips each of which is fixedly engaged to and extends vertically from an outer end of either said lower flange or said upper flange;
   (h) one or more conducting members; and
   (i) wherein a portion of one of said conducting members is mounted to one of said reinforcing lips and extends along said reinforcing lip parallel to a longitudinal axis of said novel frame rail that comprises said reinforcing lip to which said portion of said conducting member is mounted.

2. The vehicle of claim 1, further comprising:
   (a) an air-actuated brake-system.

3. The vehicle of claim 2, wherein:
   (a) said conducting member that comprises a portion that is mounted to one of said reinforcing lips is a pressurized-air-transmission conduit of said air-actuated brake-system.

4. The vehicle of claim 3, wherein:
   (a) each of said novel frame rails extends along substantially an entire length of said vehicle.

5. A vehicle, comprising:
   (a) a novel frame structure that includes two novel frame rails that extend parallel to one another and a plurality of cross-members that extend transversely between and are fixedly engaged to both of said novel frame rails;

(b) a suspension system that is engaged to said novel frame structure in a manner to support said novel frame structure above the ground;

(c) wherein said suspension system is constructed in such a manner to provide said vehicle with relatively little resistance to movement along the ground;

(d) one or more body structures that are mounted to and supported by said novel frame structure and upon or within which cargo and/or occupants may reside;

(e) wherein each of said novel frame rails comprises a vertically-extending web to an upper end of which an inner end of a horizontally-extending upper flange is fixedly engaged;

(f) wherein an inner end of a horizontally-extending lower flange is fixedly engaged to a lower end of said web of each of said novel frame rails; and (g) wherein each of said novel frame rails comprises reinforcing lips that include an upper reinforcing-lip that extends vertically from an outer end of said upper flange and a lower reinforcing-lip that extends vertically downwardly from an outer end of said lower flange.

6. The vehicle of claim 5, further comprising:

(a) one or more conducting members; and (b) wherein a portion of one of said conducting members is mounted to one of said reinforcing lips and extends along said reinforcing lip parallel to a longitudinal axis of said novel frame rail that comprises said reinforcing lip to which said portion of said conducting member is mounted.

7. The vehicle of claim 6, wherein:

(a) an air-actuated brake-system.

8. The vehicle of claim 7, wherein:

(a) said conducting member that comprises a portion that is mounted to one of said reinforcing lips is a pressurized-air-transmission conduit of said air-actuated brake-system.

9. The vehicle of claim 8, wherein:

(a) each of said novel frame rails extends along substantially an entire length of said vehicle.

10. The vehicle of claim 5, wherein:

(a) each of said novel frame rails extends along substantially an entire length of said vehicle.

11. The vehicle of claim 10, wherein:

(a) each of said lower reinforcing-lips extends along only a portion of said lower flange from which it extends.

12. The vehicle of claim 11, wherein:

(a) said suspension system comprises a front suspension-unit and a rear suspension unit;

(b) said front suspension-unit is engaged to a forward portion of each of said novel frame rails;

(c) said rear suspension unit is engaged to a rear portion of each of said novel frame rails;

(d) each of said lower reinforcing-lips has its forward most portion disposed rearward of said front suspension-unit of said vehicle; and (e) each of said lower reinforcing-lips has its rearmost portion disposed forward of said rear suspension-unit of said vehicle.

13. The vehicle of claim 12, further comprising:

(a) one or more conducting members; and (b) wherein at least a portion of one of said conducting members is attached to one of said reinforcing lips and extends along said reinforcing lip parallel to a longitudinal axis of said novel frame rail that comprises said reinforcing lip.

14. The vehicle of claim 13, further comprising:

(a) an air-actuated brake-system.

15. The vehicle of claim 14, wherein:

(a) said conducting member that comprises a portion that is mounted to one of said reinforcing lips is a pressurized-air-transmission conduit of said air-actuated brake-system.

16. The vehicle of claim 1, wherein:

(a) said portion of said conducting member that is attached to one of said reinforcing lips is more specifically attached to one of lower reinforcing-lips.

17. The vehicle of claim 5, wherein:

(a) said portion of said conducting member that is attached to one of said reinforcing lips is more specifically attached to one of lower reinforcing-lips.

18. The vehicle of claim 10, wherein:

(a) said portion of said conducting member that is attached to one of said reinforcing lips is more specifically attached to one of lower reinforcing-lips.

19. The vehicle of claim 12, wherein:

(a) said portion of said conducting member that is attached to one of said reinforcing lips is more specifically attached to one of lower reinforcing-lips.

* * * * *